FIG. 11

March 8, 1966  C. VAN DER LELY ETAL  3,239,231
SPREADING POWDERED OR GRANULAR MATERIALS
Filed July 3, 1963  10 Sheets-Sheet 8

INVENTORS
C. VAN DER LELY
H. J. C. NIEUWENHOVEN
BY
Mason, Mason & Albright
Attorneys March 8, 1966    C. VAN DER LELY ETAL    3,239,231
SPREADING POWDERED OR GRANULAR MATERIALS
Filed July 3, 1963    10 Sheets-Sheet 10

INVENTORS
C. VAN DER LELY
H. J. C. NIEUWENHOVEN

United States Patent Office 3,239,231
Patented Mar. 8, 1966

3,239,231
SPREADING POWDERED OR GRANULAR MATERIALS
Cornelis van der Lely, Zug, and Hendricus Jacobus Cornelis Nieuwenhoven, Baar, Switzerland, assignors to C. van der Lely N.V., Maasland, Netherlands, a Dutch limited-liability company
Filed July 3, 1963, Ser. No. 292,555
Claims priority, application Netherlands, July 13, 1962, 280,982, 280,983, 280,984
15 Claims. (Cl. 275—15)

This invention relates to implements for spreading powdered or granular materials, for example artificial fertilizers, such implements being of the kind comprising a frame movable over the ground, a hopper for material to be spread and a distributor adapted to be rotated about a non-vertical axis, at least one outlet port being provided in a member forming part of a wall of the hopper that is inclined or perpendicular to said non-vertical axis, and also comprising a masking member adapted to close the outlet port(s) or to open it or them to a desired extent.

An object of the invention is the provision of an implement of this kind that is capable of being adjusted readily to deal satisfactorily with different materials and with varying operating conditions.

According to the invention, there is provided an implement of the kind set forth, wherein the ported member is arranged to be angularly adjustable about said non-vertical axis and is provided with means to enable it to be retained in chosen angular settings thereabout, and wherein the masking member is arranged so as to be movable with, or relative to, the ported member and is provided with means to enable it to be retained in chosen settings relative to the ported member.

According to a further aspect of the invention, the same relates to implements for spreading powdered or granular materials, for example artificial fertilizers, comprising a frame movable over the ground, a hopper for material to be spread and a rotary distributor having a number of blades adapted to spread the material during use of the implement, wherein each spreading blade is inclined to the axis of rotation of the distributor at an angle of other than 90° and, when viewed in a direction parallel to said axis, has two curved portions, the convex side of one of which is foremost and the convex side of the other of which is rearmost with respect to the intended direction of rotation of the distributor.

According to this construction the implement is capable of distributing material uniformly over a strip of land of a relatively great width.

According to a further aspect of the invention, the same relates to implements for spreading powdered or granular materials, for example artificial fertilizers, comprising a frame movable over the ground, a hopper for material to be spread and a distributor adapted to spread material which reaches it from the hopper, wherein the frame includes two beams disposed on relatively opposite sides of a vertical plane of approximate symmetry of the implement extending parallel to the intended direction of travel thereof, the opposite ends of both said beams being downwardly inclined from curved portions of the beams. By this construction a simple and effective frame can be obtained to or from which the further parts of the implement can be connected or disconnected quickly and easily.

The invention relates further to implements for spreading powdered or granular materials, for example artificial fertilizers, comprising a frame movable over the ground, a hopper for material to be spread and a distributor adapted to spread material which reaches it from the hopper, wherein a ported member is provided between the hopper and the distributor, said member being arranged so as to be angularly adjustable about an axis with the aid of a pivotally mounted adjusting mechanism and to be retained in chosen settings about the first-mentioned axis by means of a setting member, and wherein a masking member is arranged so as to be movable relative to the ported member to open or close the port(s) to a chosen extent, the arrangement being such that the relative positions of the ported member and masking member remain unchanged during an angular adjustment of the former member about the first-mentioned axis and also such that said first axis and the axis about which the adjusting mechanism is pivotable are not parallel nor coincident. According to this construction the spreading of material can be easily and rapidly controlled during the use of the implement.

For a better understanding of the invention, and to show how the same may be carried into effect, reference will now be made, by way of example, to the accompanying drawings, in which:

FIGURE 13 is a section taken on the line XIII—XIII of FIGURE 12.

Referring to the drawings, the implement has a frame which is generally indicated by the reference numeral 1, said frame carrying a hopper 2 whose lowermost end is connected to a rotary distributor 3 adapted to spread powdered or granular material contained in the hopper 2 over the ground surface. The frame 1 includes two main beams 4 and 5 each of which is of curved configuration and tubular formation. The main beam 4 has two straight limbs 6 and 7 that are integrally interconnected by a bend 8 and the main beam 5 is similarly formed by two straight limbs 9 and 10 and a bend 11. All four of the straight limbs 6, 7, 9 and 10 have approximately the same length and the disposition of the main beams 4 and 5 is such that the bends 8 and 11 are located at the highest levels with the four straight limbs inclined downwardly from the ends thereof.

Figure 2:
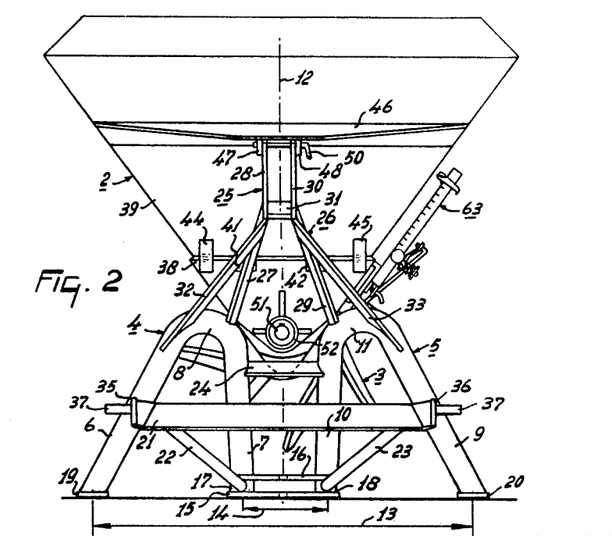
FIGURE 2 is a front elevation as seen in the direction indicated by the arrow II of FIGURE 1.

It can be seen from FIGURE 2 that the limbs 7 and 10 extend substantially parallel to a vertical plane 12 of approximate symmetry of the implement, said plane extending parallel to the intended direction of travel of the implement. The limbs 7 and 10 are inclined downwardly and rearwardly from the bends 8 and 11 relative to the intended direction of travel of the implement while the limbs 6 and 9 are inclined downwardly and forwardly relative to the said direction. The curvature of the bends 8 and 11 is such that the limbs 6 and 9 are inclined downwardly away from the plane 12 so that the lowermost ends of these limbs are spaced apart by a distance 13 which is preferably equal to not less than twice the distance 14 between the lowermost ends of the straight limbs 7 and 10. In the embodiment illustrated in the drawings the distance 13 is, in fact, equal to approximately four times the distance 14. The lowermost ends of the limbs 7 and 10 are interconnected by two parallel but vertically spaced strips 15 and 16 that are located one above the other. The strip 15 affords a foot plate for the implement and the lowermost ends of the limbs 6 and 9 are also provided with individual foot plates 19 and 20 so that, when the implement is standing on the ground as illustrated in the drawings, it bears thereon by means of the three parts 15, 19 and 20 thus minimising any tendency for the implement to sink into soft soil. As can be seen in the drawings, the strips 15 and 16 are interconnected by vertically disposed spacers 17 and 18 located in register with the lowermost ends of the limbs 7 and 10 respectively. A horizontally extending beam 21 interconnects approximately the mid-points of the two limbs 6 and 9, these same points being connected to the spacers 17 and 18 respectively by tubular ties 22 and 23.

Figure 1:
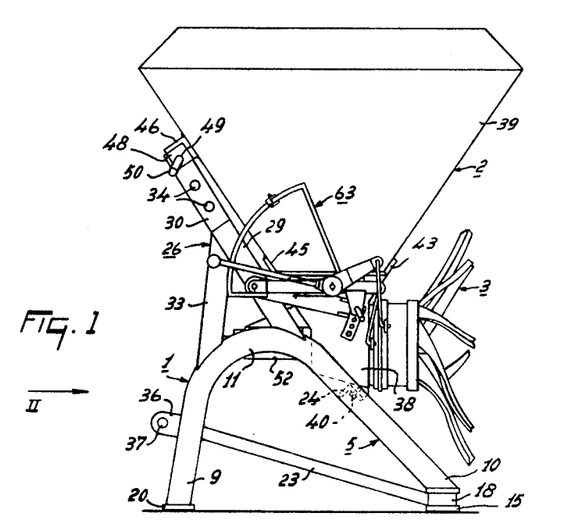
FIGURE 1 is a side elevation of a spreading implement in accordance with the invention.

A horizontally extending support 24 of L-shaped cross-section interconnects the limbs 7 and 10 towards the uppermost ends thereof. As can be seen in FIGURE 1, a lower portion 38 of the hopper 2 is rigidly secured to the support 24 with the aid of a bolt 40. Further supports that are generally indicated by the reference numerals 25 and 26 are carried by the bends 8 and 11 of the main beams 4 and 5 respectively, these supports taking the form of assemblies of strips. The support 25 includes a strip having two relatively inclined portions 27 and 28 while the support 26 includes a symmetrical strip having two portions 29 and 30. The lowermost ends of the portions 27 and 29 are fixed to the bends 8 and 11 respectively and converge upwardly and forwardly therefrom relative to the intended direction of travel of the implement. As can be seen in FIGURE 2, the portions 28 and 30 extend in parallel but spaced relationship, a transverse strip 31 rigidly interconnecting the two strips that have just been described at the level of the junctions between their portions 27, 28 and 29, 30. It will be noted that, when seen in side elevation (FIGURE 1), the portions 27 to 30 of the supports 25 and 26 are in approximately longitudinal alignment with the limbs 7 and 10 of the main beams 4 and 5.

The supports 25 and 26 also include strip-shaped struts 32 and 33 respectively, the strut 32 interconnecting the bend 8 and the portion 27 immediately below the transverse strip 31 while the strut 33 similarly interconnects the bend 11 and the portion 29. It will be noted that, in side elevation (FIGURE 1), the struts 32 and 33 are in approximate alignment with the limbs 6 and 9 of the main beams 4 and 5.

The parallel portions 28 and 30 of the supports 25 and 26 are provided with two pairs of horizontally aligned holes 34 through which a pivot pin may be entered to connect the supports to the free end of the upper adjustable lifting link of a three-point lifting device carried by a tractor or other propelling and supporting vehicle. The opposite ends of the beam 21 are bent over so as to form forwardly projecting lugs 35 and 36 from which horizontally aligned pins 37 project in relatively opposite directions. The pins 37 are employed to connect the implement to the free ends of the lower lifting links of a three-point lifting device.

The frame 1 of the implement that has been described is completely symmetrical with respect to the plane 12 as is the hopper 2 which is supported thereby. In addition to the aforementioned lower portion 38 of the hopper 2 which is normally rigidly secured to the frame 1, the hopper comprises an upper portion 39 arranged so that it can be readily released from the lower portion 38 and from the supports 25 and 26. The portions 27 and 29 of the supports 25 and 26 carry fastening plates 41 and 42 respectively, these plates being located at the level of the junction between the lower and upper portions 38 and 39 of the hopper 2. The uppermost edge of the lower portion 38 of the hopper 2 is, in fact, fixed to the fastening plates 41 and 42 by bolts which are not visible in the drawings. The lowermost delivery mouth of the upper portion 39 of the hopper 2 nests within the open upper end of the lower portion 38. In order to assist in retaining these parts in their correct relationship, the rear wall of the upper portion 39 has an abutment strip 43 resting on the uppermost edge of the rear wall of the lower portion 38. Furthermore, the front wall of the upper portion 39 has the upper ends of two profiled strips 44 and 45 fixed to it, the lower ends of the strips being bent so as to engage the front side of the front wall of the lower portion 38, and the mid-portions of the strips resting on the uppermost edge of the front wall of the lower portion 38.

A horizontally extending bar 46 of L-shaped cross-section has one of its limbs rigidly secured to the front wall of the upper portion 39 of the hopper 2 at the level of the uppermost ends of the supports 25 and 26. The other projecting limb of the bar 46 is of trapezoidal shape as can be seen in FIGURE 2 and a central region thereof carries two downwardly projecting lugs 47 and 48 that are spaced so as to engage relatively opposite sides of the uppermost ends of the portions 28 and 30. The lugs 47 and 48 and also the uppermost ends of the portions 28 and 30 are formed with registering holes 49 through which a horizontal locking pin 50 is entered to retain the upper portion 39 of the hopper 2 in its appointed position. The lugs 47 and 48 are so arranged that they afford stops that prevent the upper portion 39 of the hopper 2 from moving laterally relative to the frame 1. The lower portion 38 of the hopper is traversed by a horizontal driving shaft 51 that extends parallel to the intended direction of travel of the implement which is indicated by the arrow P in FIGURE 1. The shaft 51 is journalled in a horizontal bearing 52 fastened to, and located in front of, the front wall of the lower portion 38 of the hopper 2. The rearmost end of the shaft 51 relative to the direction P supports the rotary distributor 3 which is disposed rearwardly of the lower portion 38.

The lower portion 38 of the hopper 2 has a cylindrical mouth 59 of which is closed by a circular plate 53 in which three outlet ports 54, 55 and 56 (FIGURE 4) are formed. The outlet ports 54 and 55 are 180° removed from one another about the longitudinal axis of the shaft 51 whereas the port 56 is spaced mid-way between them so that it is removed from the former ports about the longitudinal axis of the shaft 51 by angles 57 and respectively, each having a magnitude of 90°. The circular plate 53 is arranged around, and is concentric with, the shaft 51, a cylindrical rim 60 projecting from one side of the said plate adjacent its edge and being arranged in centering and substantially sealing relationship with the cylindrical mouth 59 of the hopper portion 12.

An apertured lug 61 projects from the edge of the circular plat 53 and the lowermost end of a coupling rod 62 is pivotally connected to this lug. The uppermost end of the coupling rod 62 is pivotally connected to an adjusting mechanism that is generally indicated by the reference numeral 63 (FIGURES 1 and 2).

Powdered or granular material contained in the hopper 2 can reach the rotary distributor 3 by way of the outlet ports 54, 55 and 56 but an adjustable masking plate 64 formed with four outlet holes 65, 66, 67 and 68 is arranged against the plate 53 in such a way that the outlet ports 54 and 56 may be wholly or partly closed thereby. The outlet holes 65 and 66 are 180° removed from one another about the longitudinal axis of the shaft 51 whereas the outlet hole 67 is angularly spaced from the outlet hole 65 by an angle 69 of 75° and from the outlet hole 66 by an angle 70 of 105°. The outlet hole 68 is angularly spaced from the outlet hole 65 by an angle 71 of about 70° and from the outlet hole 66 by an angle 72 of about 110°.

Figure 4:
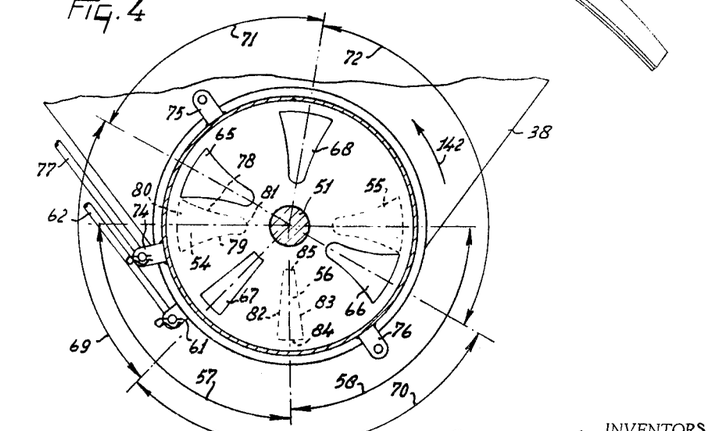
FIGURE 4 is a section taken on the line IV—IV of FIGURE 3, FIGURES 5 to 8 correspond to FIGURE 4 but show certain parts of the implement in different relative positions.

The masking plate 64 carries a cylindrical rim 73 which acts in a similar manner to the rim 60 of the plate 51 to center and substantially seal the masking plate with respect to the cylindrical mouth 59 and the circular plate 51. The edge of the masking plate 64 carries three angularly spaced and apertured lugs 74, 75 and 76 one of which, such as the lug 74 in FIGURE 4, is pivotally connected to the lowermost end of a coupling rod 77. The uppermost end of the coupling rod 77 is connected to the adjusting mechanism 63.

The outlet ports 54 and 55 are of identical shape and, as can be seen in FIGURE 4 in respect of the outlet port 54, each of them has two opposite sides 78 and 79 that extend very approximately radially of the shaft 51 but which, in fact, are of gently curved configuration. The sides 78 and 79 are curved in opposite directions and each of them projects inwardly towards the center of the port 54. As can be seen in FIGURE 4, the port 54 is of very approximately triangular shape, its base being formed by a curved side 80 whose center of curvature coincides with the longitudinal axis of the shaft 51. The side 80 interconnects the ends of the sides 78 and 79 remote from the shaft 51 whereas the ends of the sides which are closest to the shaft 51 are interconnected by a tight bend 81 corresponding to the apex of the triangular port. As a consequence of the approximately triangular shape of the port 54, its width progressively increases from the tight bend 81 to the side 80. The outlet holes 65, 66 and 68 are identical in configuration to the outlet ports 54 and 55 so that no further description thereof is required.

Both the outlet port 56 and the outlet hole 67 have the same shape and, as can be seen in FIGURE 4 in respect of the outlet port 56, this port has two straight sides 82 and 83 that extend radially of the shaft 51, the opposite ends of these sides being interconnected by longer and shorter sides 84 and 85 respectively both of which extend wholly or substantially tangentially relative to circles centered on the longitudinal axis of the shaft 51. The outlet port 56 is thus of trapezoidal shape.

Figure 9:
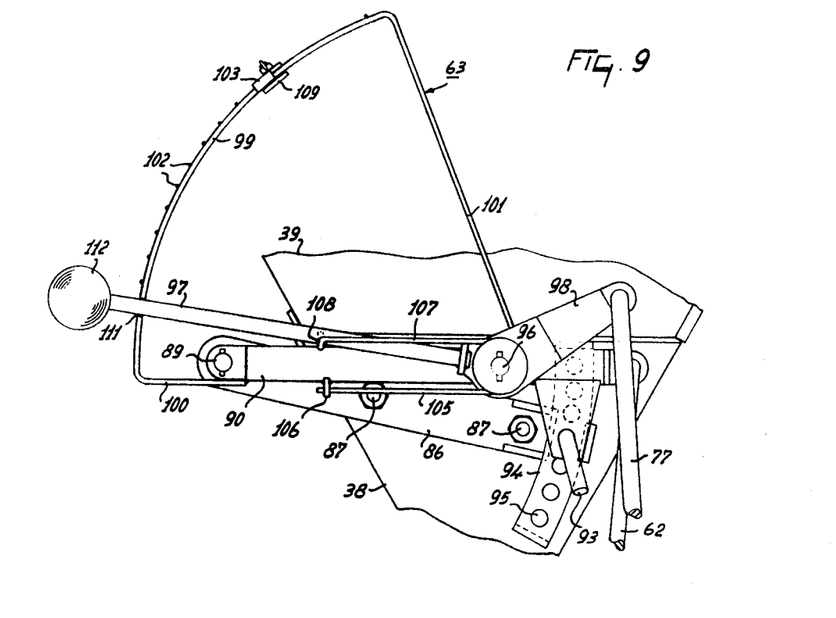
FIGURE 9 is a side elevation showing certain of the parts which can be seen in FIGURE 1 to an enlarged scale and in greater detail.
Figure 10:
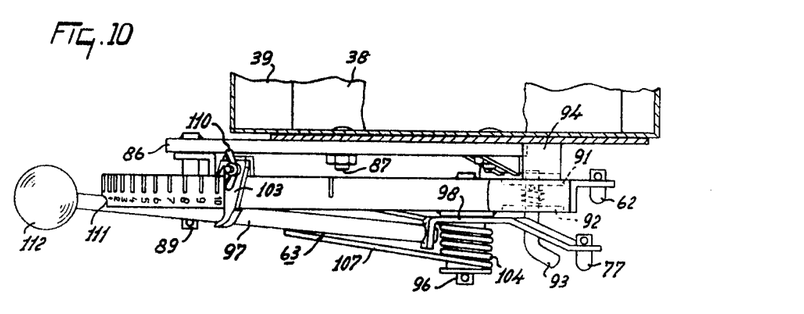
FIGURE 10 is a plan corresponding to FIGURE 9.

The angular settings of the circular plate 53 and masking plate 64 about the longitudinal axis of the driving shaft 51 can be varied with the aid of an adjusting mechanism that is generally indicated by the reference numeral 63 and which is illustrated in greatest detail in FIGURES 9 and 10 of the drawings. The adjusting mechanism 63 is mounted on a support 86 which is itself fastened to one side of the lower portion 38 of the hopper 2 with the aid of a pair of bolts 87. The support 86 carries a pivot pin 89 about which one end of an arm 90 is turnable. The opposite end of the arm 89 is pivotally connected to one end of a coupling rod 62 whose opposite end, in turn, is pivotally connected to a lug 61 (FIGURE 4) projecting from the edge of the circular plate 53. The arm 90 carries two downwardly projecting and relatively spaced lugs 91 and 92 towards the end thereof remote from the pivot pin 88, said lugs supporting a spring-loaded locking pin 93. The support 86 carries an arcuate strip 94 whose center of curvature coincides with the longitudinal axis of the pivot pin 89, said strip being formed with a plurality of holes 95 into any one of which the tip of the locking pin 93 can be entered to retain the arm 90 in a corresponding angular setting about the pivot pin 89 and thus the circular plate 53 in a corresponding angular setting about the longitudinal axis of the driving shaft 51.

The arm 90 carries a pivot pin 96 which is located towards the end of the arm 90 remote from the pivot pin 89 but whose longitudinal axis extends parallel to that of the said pin 89. A control lever 97 has one end turnably mounted on the pivot pin 96, this end carrying a projecting arm 98 to the free end of which is pivotally connected to one end of a coupling rod 77. The opposite and lower end of the coupling rod 77 is pivotally connected to a lug 74 (FIGURE 4) projecting from the edge of the masking plate 64.

The control lever 97 is movable along an arcuate strip-shaped scale 99 one bent-over end 100 of which is fastened to the arm 90 adjacent the pivot pin 89 and the opposite longer bent-over end 101 of which is fastened to the arm 90 adjacent the pivot pin 96. The surface of the scale 99 is provided with a series of ten appropriately numbered ribs 102 and with a stop 103 that is mounted on the scale in such a way that it can be slid therealong and retained in any chosen position.

A helical spring 104 is wound around a former mounted on the pivot pin 96 and has one end 105 entered through a hole formed in a lug 106 projecting downwardly from the arm 90. The other end 107 of the spring 104 is formed with a bent-over hook 108 that is engaged beneath the control lever 97 very approximately mid-way along the length thereof. The spring 104 is wound in such a way that the end 107 thereof tends to turn in a clockwise direction in FIGURE 9 so as to urge the control lever 97 upwardly into engagement with the stop 103.

In order to be able to retain the stop 103 in chosen positions longitudinally of the scale 99, the lowermost side of the stop 103 carries a clamping plate 109 which can be tightened against the scale 99 with the aid of a wing-nut 110. A recess 111 is formed in the edge of the strip-shaped scale 99 in register with the rib 102 numbered "0." In addition to tending to turn the control lever 97 in a clockwise direction in FIGURE 9, the spring 104 is formed in such a way that it urges the control lever gently into contact with the edge of the scale 99 in which the recess 111 is formed. Thus, upon moving the control lever 97 into the recess 111 with the aid of a knob 112 carried by the free end of the lever, the spring 104 will tend to maintain the control lever 97 in this position and resist mechanical shocks which might otherwise jolt the lever clear of the recess 111. An additional un-numbered rib 113 is provided at the uppermost end of the scale 99 and the pointer forming part of the stop 103 can be brought into register with this rib for a purpose which will hereinafter be described.

An annular hood-shaped delivery spout 114 is fastened to the masking plate 64 so as to project from that side thereof which is remote from the lower portion 38 of the hopper 2. The longitudinal axis of the annular spout 114 coincides with the longitudinal axis 128 of the shaft 51. The masking plate 64 and spout 114 are engaged by the rotary distributor 3, the latter including a cylindrical sleeve 117 that is arranged concentrically around a hub 115 rigidly connected to the rearmost end of the shaft 51 by a small transverse pin 116. The sleeve 117 is retained in its appointed position by annular plates 118 and 119 whose radially innermost edges are secured to the hub 115 and whose radially outermost edges are secured to the said sleeve 117.

The sleeve 117 carries a number of vanes 120 that are wound helically around the longitudinal axis 128 of the driving shaft 51. Each vane 120 has one end 121 disposed alongside the masking plate 64 and the opposite end 122 contained in a plane extending perpendicular to the longitudinal axis 128, said plane also containing the rearmost end of the sleeve 117. The rearmost ends 122 of all the vanes 120 are interconnected by a ring 123 which is concentric with the shaft 51 and which is shouldered so as to carry an annular flange 124 that engages around the rearmost end of the hood-shaped delivery spout 114.

Figure 3:
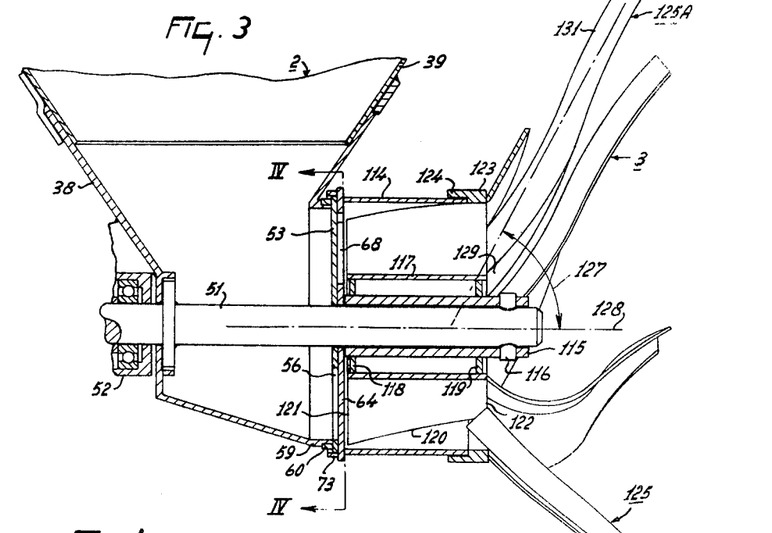
FIGURE 3 is a section, to an enlarged scale, taken on the line III—III of FIGURE 2.

The rotary distributor 3 includes eight spreading blades 125 which engage the vanes 120 adjacent their ends 122. The spreading blades 125 are angularly spaced at 45° intervals around the longitudinal axis 128 and, since they are identical in construction, only one of them 125A, which can be seen best in FIGURES 3 and 11, will be described in detail. The spreading blade 125A extends approximately parallel to an imaginary plane 126 (FIGURE 3), said plane being inclined at an angle 127 of 65° to the longitudinal axis 128 of the shaft 51. In fact, as can be seen in FIGURE 3, the blade 125A is not quite straight but is bent in such a way that its root 129 which engages one of the vanes 120 is inclined to the axis 128 at an angle whose magnitude is a little less than that of the angle 127. A central region 131 of the blade 125A extends substantially parallel to the imaginary plane 126 whereas its tip 130 once again extends in a direction inclined to the axis 128 at an angle which has a slightly smaller magnitude than that of the angle 127.

Figure 11:
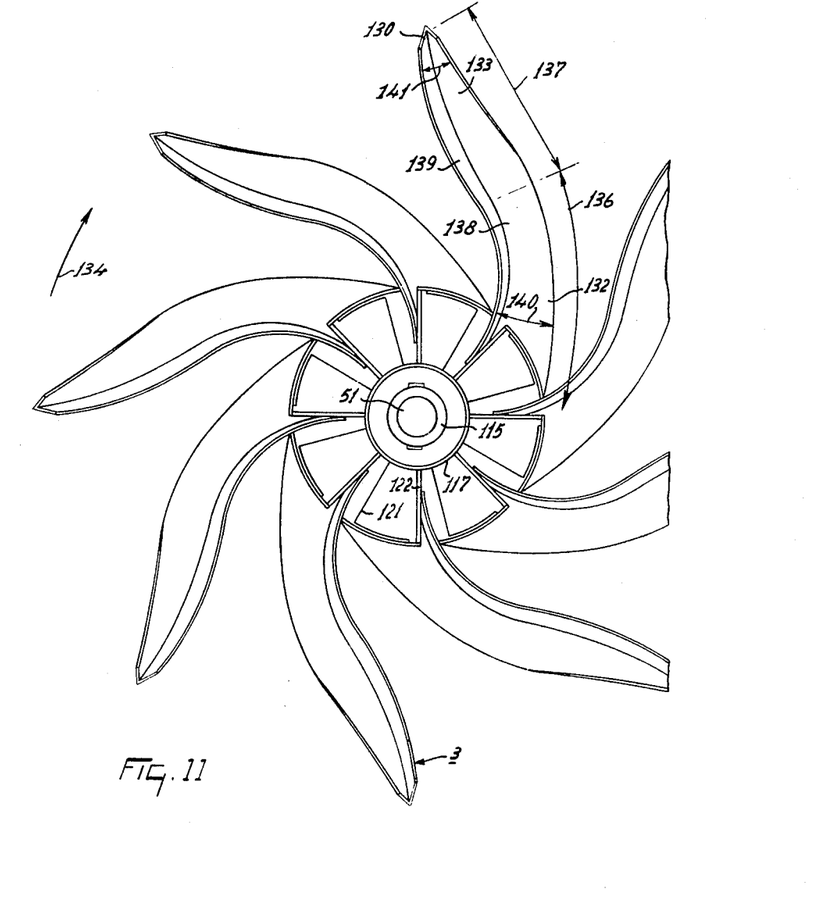
FIGURE 11 is a view, to an enlarged scale, as seen in the direction indicated by the arrow XI of FIGURE 1, FIGURE 12 corresponds generally to FIGURE 3 but shows an alternative embodiment of certain parts of the implement.

When viewed in a direction parallel to the longitudinal axis 43 (FIGURE 11), the blade 125A can be seen to have a radially inner portion 132 which is curved in one direction and a radially outer portion 133 which is curved in a relatively opposite direction. The rotary distributor 3 is intended to be rotated in the direction indicated by the arrow 134 in FIGURE 11 and it will be seen that the convex side of the inner portion 132 is disposed foremost relative to this direction while the convex side of the the outer portion 133 is disposed rearmost relative thereto. The length 136 of the portion 132 is equal to approximately one and a half the length 137 of the portion 133. The spreading blade 125A is of very approximately V-shaped cross section and has two limbs 138 and 139 that are inclined to one another at an angle which progressively decreases in a direction radially outwardly of the blade. As can be seen in FIGURE 11, the limbs 138 and 139 are inclined to one another in the region of the root 129 of the blade at an angle 140 having a magnitude of about 125° while in the region of the tip 130 of the blade, they are inclined to one another at an angle 141 of about 110°. The blade 125A is mounted in such a way that the limb 138 thereof extends very approximately parallel to the imaginary plane 126 and in such a way that the limb 139 projects from the edge thereof in a direction generally towards the axis 128.

In the use of the implement which has been described, the implement is supported by the three-pointing lifting device of a tractor or other vehicle that is employed to move the implement over the ground. The rotary distributor 3 is rotated by the power take-off shaft of the tractor or other vehicle through the intermediary of an approximately horizontal driving shaft 51 journalled in a bearing 52 secured to, and supported by, the lower portion 38 of the hopper 2. It will be noted that this arragment avoids providing the frame 1 with parts specifically adapted to support the driving shaft 51 and that the bends 8 and 11 of the main beams 4 and 5 are spaced apart by a distance which is sufficient to allow the parts 51 and 52 to lie between them. The lower portion 38 of the hopper 2 is provided with adjusting mechanism that is generally indicated by the reference numeral 63. When the circular plate 53 and masking plate 64 occupy the relative positions shown in FIGURE 4, all the outlet ports 54 to 56 are completely closed but, as soon as the masking plate 64 is turned relative to the circular plate 53 in the direction indicated by the arrow 142, the outlet holes 65 and 66 will come wholly or partly into register with the outlet ports 54 and 55 to open these ports to an extent chosen by the setting of the control lever 97 along the scale 99. It will be evident that the extent to which the holes 65 and 66 register with the ports 54 and 55 determines the amount of material per unit time which will reach the rotary distributor 3.

Figures 5, 6, 7, 8:
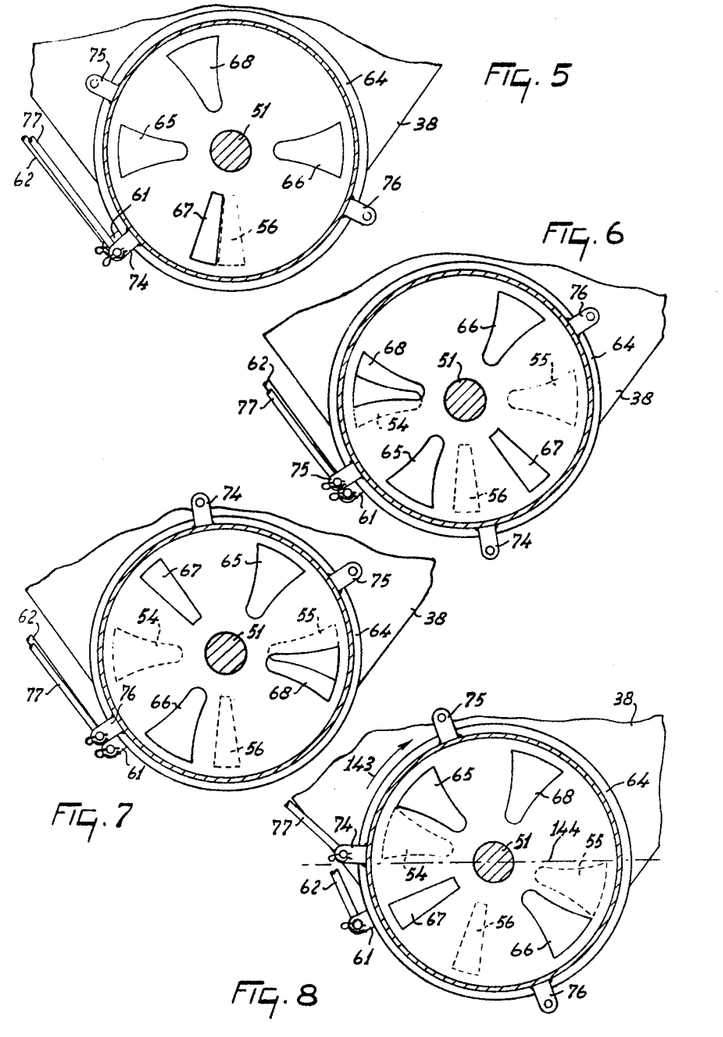

FIGURE 5 shows the relative position of the circular plate 53 and masking plate 64 when the latter has been rotated in the direction 142 (FIGURE 4) with respect to the former until the outlet holes 65 and 66 are fully in register with the outlet ports 54 and 55. It will be apparent from what has previously been stated that the quantity of material per unit time which is spread by the implement will be a maximum in this setting. When the hopper 2 is almost empty so that only a small quantity of material remains beneath the shaft 51, this material can be utilised by turning the masking plate 64 further in the direction 142 until the trapezoidal outlet hole 67 comes fully into register with the similarly shaped outlet port 56. Since the lowermost side 84 of the port 56 is located at substantially the same level as the bottom of the hopper 2, substantially all the material contained in the hopper will be able to escape through the port 56.

When both the outlet ports 54 and 55 are employed to allow material from the hopper 2 to reach the rotary distributor 3, the material will be spread over a strip of land whose center approximately coincides with a vertical plane 12 (FIGURE 2) of substantial symmetry of the implement and its propelling vehicle extending in the direction of travel thereof. However, under certain circumstances, it is desirable that material should be spread substantially wholly to one or other side of the plane 12 and FIGURES 6 and 7 of the drawings show the relative settings of the plates 53 and 64 which are employed to effect this.

FIGURE 6 of the drawings shows a relative setting of the circular plate 53 and masking plate 64 which is such that material spread by the implement falls substantially wholly to the right of the plane 12 when viewed in the direction of travel of the implement. As can be seen in the drawing, only the outlet port 54 is made use of while the outlet port 55 remains completely closed. To this end, the lowermost end of the coupling rod 77 is disconnected from the lug 74 and the masking plate 64 is turned manually about the shaft 51 until the lug 75 can be engaged with the coupling rod. The control lever 97 can then be employed in the manner previously described to bring the outlet hole 68 into register with the outlet port 54 to an extent corresponding to the volume of flow of material per unit time which is required. It will be noted that, when the hopper 2 is almost empty, the masking plate 64 can be turned further in the direction 142 (FIGURE 4) to bring the outlet hole 65 into register with the outlet port 56.

FIGURE 7 shows the relative arrangement of the plates 53 and 64 which is employed when it is desired that material from the hopper 2 should be spread substantially wholly to the left of the plane 12 (FIGURE 2). In this case, the lowermost end of the coupling rod 77 is pivotally connected to the lug 76 instead of to the lug 75 so that the outlet port 54 is entirely closed while the outlet hole 68 can be brought into register with the outlet port 55 to a desired extent. Once again, residual material in the hopper 2 can be released by turning the masking plate 64 further in the direction 142 to bring the outlet hole 66 into register with the outlet port 56.

The position of the strip of land which receives material relative to the plane 12 can be adjusted as required at any time with the aid of the adjusting mechanism 63. Since the control lever 97 and scale 99 are connected to the arm 90, these parts will turn together with that arm upon pivotally adjusting the same about the pin 89. Accordingly, the circular plate 53 and masking plate 64 will turn together about the shaft 51, their positions relative to one another remaining substantially unchanged.

FIGURE 8 shows a setting in which both the circular plate 53 and the masking plate 64 have been turned about the shaft 51 through a relatively small angle in a direction 143 as compared with the setting shown in FIGURE 4. The arrangement is such that, generally speaking, the knob 112 carried by the control lever 97 which projects forwardly of the implement will be readily accessible to the driver of a supporting and propelling tractor so that, by moving the said lever, he will be able to control the volume of material per unit time which reaches the rotary distributor 3 from the hopper 2. When the various parts occupy the relative positions shown in FIGURES 4, 9 and 10 of the drawings, the control lever 97 is lodged in the recess 111 and none of the outlet holes 65 to 68 are even partly in register with any of the outlet ports 54 to 56. It will be evident that no material will reach the rotary distributor 3 at such times.

Upon withdrawing the control lever 97 from the recess 111 the spring 104 will urge the said lever upwardly in FIGURE 9 into abutting contact with the stop 103. At the same time, the masking plate 64 will be rotated about the longitudinal axis of the driving shaft 51 to bring one or more of the outlet holes 65 to 68 into total or partial register with one or more of the outlet ports 54 to 56. When, for example, the control lever 97 comes into contact with the stop 103 in the position of the latter illustrated in FIGURES 9 and 10 of the drawings, the outlet holes 65 and 68 will be in complete register with the outlet ports 54 and 56 respectively. By fixing the stop 103 against one of the other ribs 102 and moving the control lever 97 into contact therewith, the outlet ports 54 and 55 will be only partially opened.

When the supply of material to the rotary distributor 3 is to be interrupted, all that is necessary is for the operator to move the control lever 97 back into the recess 111 thereby completely closing the outlet ports 54 and 55. Distribution of the material can be re-commenced rapidly merely by withdrawing the control lever 97 from the recess 111 whereafter the spring 104 will automatically turn it upwardly into engagement with the stop 103. This action will re-open the outlet ports 54 and 55 and it will be noted that, since the position of the stop 103 remains unaltered, exactly the same volume of material per unit time will be spread after a temporary interruption as before.

When only a very small amount of material is left in the hopper 2 beneath the driving shaft 51, it is necessary that the lowermost outlet port 56 should be opened to allow this material to reach the rotary distributor 3. This can be achieved by moving the stop 103 and control lever 97 into register with the aforementioned rib 113 at which time the outlet hole 22 will be opposite the outlet port 56.

As can be seen in FIGURE 2, the longitudinal axis of the pivot pin 89 extends perpendicular to the adjacent side wall of the hopper 2 alongside which the adjusting mechanism 63 is disposed. The said axis is, in fact, inclined at an angle of approximately 35° to the horizontal and it will therefore be obvious that this axis is also inclined to the substantially horizontal axis of the driving shaft 51 about which the rotary distributor 3, the circular plate 53 and the masking plate 64 are all turnable. The two axes which have just been mentioned in fact extend perpendicular to one another but, as will be evident from the drawings, do not intersect one another.

The arrangement of the adjusting mechanism 63 at one side of the hopper 2 with the control lever 97 projecting forwardly thereof has the advantage that the said control lever is normally readily accessible to the driver of a supporting and propelling tractor so that the driver can quickly and easily control the rate of flow of the material to the rotary distributor 3. Material which enters the spout 114 is engaged by the helical vanes 51 and is urged positively towards the roots 129 of the spreading blades 125. The blades act to spread the material over the ground surface.

There are eight of the vanes 120 arranged within the hood-shaped spout 114 in such a way that they divide the interior of the latter into eight compartments which do not communicate with one another to any substantial extent. The rearmost end of each vane 120 is engaged by the root 129 of a corresponding blade 125. The gentle helical configuration of the vanes 120 tends to insure a steady and continuous delivery of the material to the blades 125. The shape of the spreading blades 125 is such that, during use of the implement, the material in the hopper 2 can be spread over a relatively wide strip of ground so that a substantial economy can be made in the time and labour required to spread, for example, artificial fertilizer over a field since the number of passes of the implement required to cover the whole field is appreciably reduced.

It can be seen from FIGURE 1 of the drawings that, by virtue of the shape of the frame 1, the rotary distributor 3 is not surrounded by any of the other parts of the implement so that, during use of the implement, material can leave the distributor in any chosen direction. Moreover, all the parts of the rotary distributor 3 are readily accessible for purposes such as cleaning. When the implement is not in use, it stands on the ground as shown in the drawings through the intermediary of the foot plates 15, 19 and 20. This arrangement ensures adequate stability of the implement since the distance 13 is large relative to its other dimensions as is the perpendicular distance between the strip or foot plate 15 and a line joining the foot plates 19 and 20.

In order to remove the upper portion 39 of the hopper 2 from the frame 1, all that is required is to withdraw the locking pin 50 whereafter the said portion can be lifted away from the remainder of the implement. When required, the lower portion 38 of the hopper 2 can be removed from the frame 1 by withdrawing the bolt 40 and also the bolts associated with the fastening plates 41 and 42. The simple construction of the implement facilitates its manufacture and assembly. The construction is also such that the dismantled implement occupies a relatively small volume of space. This is clearly advantageous in relation to the transport and storage of the implement.

FIGURES 12, 13, 14 and 15 illustrate an alternative embodiment of the delivery region of the hopper 2 and of the parts which co-operate therewith. However, those parts that are identical with, or similar to, parts that have already been described are denoted by the same reference numerals as previously employed. The circular ported plate 53 is replaced by an outlet portion 146 within which three delivery ducts 147, 148 and 149 are mounted. The ducts 147 to 149 are located in the same relative positions as the previously described outlet ports 54, 55 and 56 respectively and the rearmost ends of these ducts constitute outlet ports of the hopper 2. The outlet portion 146 has foremost and rearmost circular end plates 152 and 153 respectively and the ducts 147 to 149 extend between registering holes formed in these plates. The plates also have central holes adapted for co-operation with the shaft 51. Each of the ducts 147 to 149 includes a curved wall 150 and also a wall 151 shaped to define the chosen cross-sectional configuration of the duct. The foremost end plate 152 of the outlet portion 146 is provided with a forwardly projecting rim 154 that engages in centring and substantially sealing relationship around the cylindrical mouth 59 of the lower portion 38 of the hopper 2.

An impeller 155 is fixed to the shaft 51 within the hopper mouth 59 and immediately in front of the foremost end plate 15 of the outlet portion 146. The impeller 155 has four vanes 156, 157, 158 and 159 each of which extends radially of the shaft 51 by a distance which is such that it overlaps the inlet end of each duct 147 to 149, at times when it is in register therewith, by a distance 160 (FIGURE 12) equivalent to one-third of the radial extent 161 (FIGURE 14) of each duct. The outlet portion 146 and the masking plate 64 are enclosed between the cylindrical mouth 59 of the hopper portion 38 and a hub 162 of a rotary distributor 163 which hub is fastened to the rearmost end of the driving shaft 51 with the aid of a small transverse pin 166. The rotary distributor 163 is of a different construction to the previously described distributor 3 and has only four spreading blades 164 whose roots are fastened to the hub 162 and support a ring 165 of approximately the same outer diameter as the masking plate 64.

Figures 12, 13:
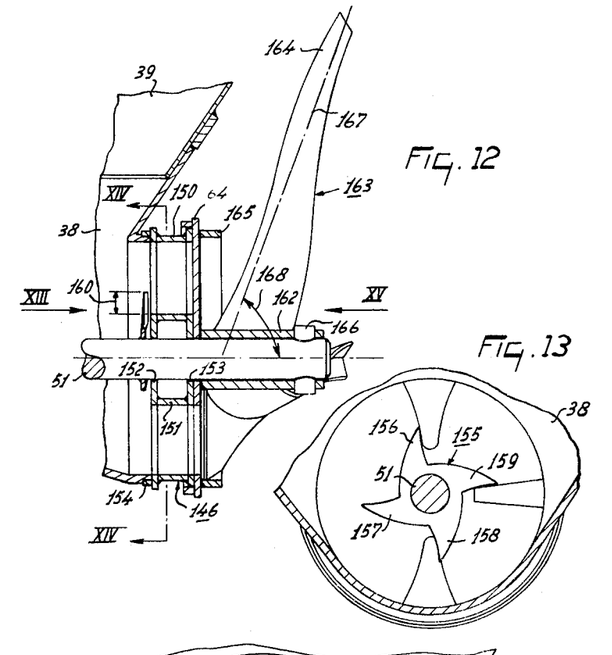
Figure 14:
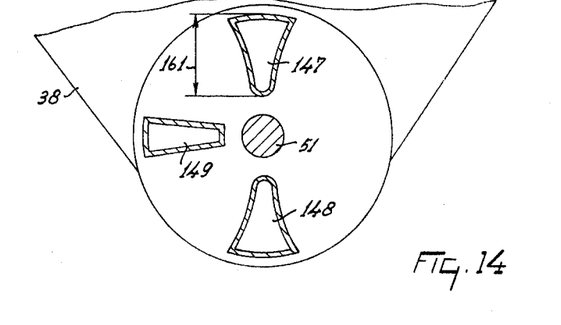
FIGURE 14 is a view as seen in the direction indicated by the line XIV of FIGURE 12.

The vanes 156 to 159 of the impeller 155 are slightly inclined to a plane extending perpendicular to the shaft 51, as can be seen in FIGURE 12, so that, during use of the implement, the vanes of the rotating impeller 155 urge material rearwardly into the ducts 147 to 149. The distributor 163 has a hub 162 secured to the end of the driving shaft 51 with a small transverse pin 166 and being in abutting engagement with the masking plate 64. The four spreading blades 164 each of which has approximately the same configuration as the previously described spreading blade 125A. However, as can be seen in FIGURE 12 each spreading blade 164 extends approximately parallel to an imaginary plane 167 that is inclined to the longitudinal axis 128 of the shaft 51 by an angle 162 having a magnitude of approximately 70°.

Figure 15:
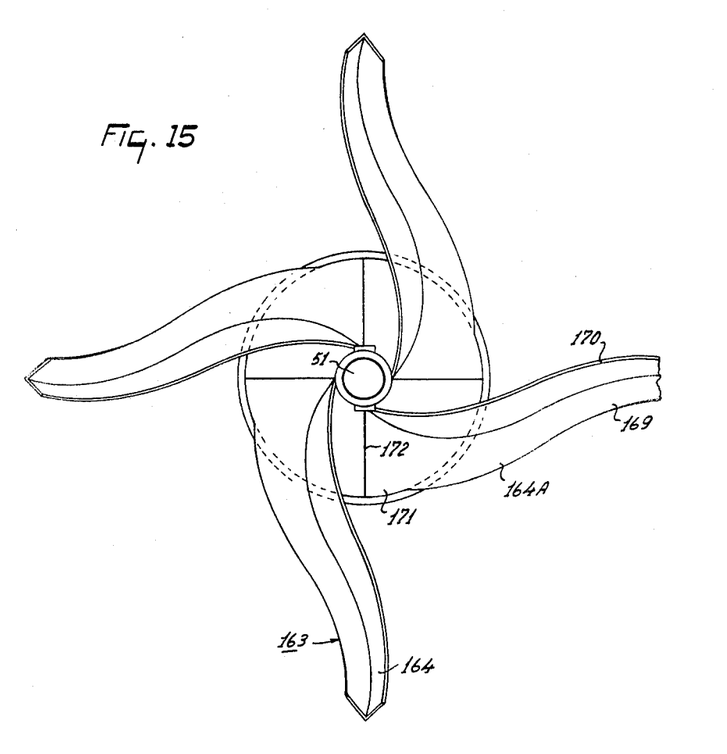
FIGURE 15 is a view as seen in the direction indicated by the arrow XV of FIGURE 12, FIGURE 16 corresponds to FIGURE 3 but illustrates the provision of additional parts of the implement.

As can be seen in FIGURE 15 in respect of one of the four spreading blades 164A, each blade has two limbs 169 and 170 that are arranged in V-shaped relationship, the limb 169 terminating at the root end 171 of the blade in an edge 172 extending perpendicular to the axis 128. As can be seen in FIGURE 12, each edge 172 abuts against the rearmost side of the masking plate 64. The roots 171 of the four spreading blades 164 are interconnected by a ring 165 that is concentric with the shaft 51 and which has approximately the same outer diameter as the masking plate 64. The manner of adjustment of the masking plate 64 relative to the outlet portion 146 and also the manner of common adjustment of these two parts relative to the cylindrical mouth 154 of the hopper 2 is substantially identical to that previously described with reference to FIGURES 1 to 8 of the drawings in connection with the parts 53 and 64 so that no further description thereof is required.

The use of the arrangement described with reference to FIGURES 12 to 15 has been found to improve the delivery of the material under certain operating conditions. It will be noted that the ducts 147 to 149 of the outlet portion 146 are each rotated through 90° about the longitudinal axis of the shaft 51 relative to the positions of the corresponding outlet ports 54 to 56 of the circular plate 53. The masking plate 64 having the outlet holes 65 to 68 is also turned through 90° relative to the position described with reference to FIGURES 1 to 8. This is because the material from the hopper 2 travels through the ducts 147 to 149 in directions approximately parallel to the shaft 51 and, once it passes through the outlet holes 65 to 68, it is immediately engaged by the roots of the spreading blades 168. In the embodiment described with reference to FIGURES 1 to 8, the material passes through the delivery spout 114 before reaching the roots of the spreading blades 125 and is moved helically about the axis of the shaft 51 by the vanes 120 contained within the said spout. It will be apparent that the position of the strip of land upon which the material falls relative to the plane 12 can be adjusted as desired in the same manner as previously described with reference to FIGURES 4 to 8. The duct 149 is intended to be used in the same way as the previously described outlet port 56 but, if desired, the duct 149 may be omitted altogether, together with the outlet hole 67 in the masking plate 64 and the duct 148 employed for releasing residual material from the hopper 2.

In the embodiments of the implement which have so far been described, a part 114, or parts 147 to 149, have been provided on one or other side of the outlet ports of the hopper through which material from the said hopper moves parallel to, or around, the shaft 51. However, a ported member with the ports positioned around an axis as mentioned herebefore may also be used in arrangement with a masking plate such as the plate 64 without the use of a spout such as the spout 114, or ducts, such as the ducts 147, 148 and 149. The part 53 or 146 together with the part 26 is enclosed between the cylindrical mouth 59 of the hopper portion 38 and a hub of the rotary distributor. This arrangement allows the parts which have just been mentioned to be assembled and dismantled readily when the rotary distributor has been removed from the end of the shaft 51.

When the modified form of the implement illustrated in FIGURES 12 to 15 is employed, material from the hopper 2 passes through the ducts in the outlet portion 146 and through the outlet holes in the masking plate 64 to the rotary distributor 163 and is immediately engaged by the edges 172 of the root portions 171 of the blades 164. The edges 172 act in a similar manner to the vanes 120 of the previously described embodiment in collecting the material which leaves the outlet holes of the masking plate 64. In view of the fact that, after leaving the masking plate 64, the material is not rotated around the axis 128 by the vanes 120 in the embodiment illustrated in FIGURES 12 to 15, the delivery ducts of the outlet portion 146 and also the outlet holes of the masking plate 64 occupy positions in which they are rotated about the axis 128 relative to the positions of the corresponding parts in the embodiment illustrated with reference to FIGURES 1 to 8.

Figure 16:
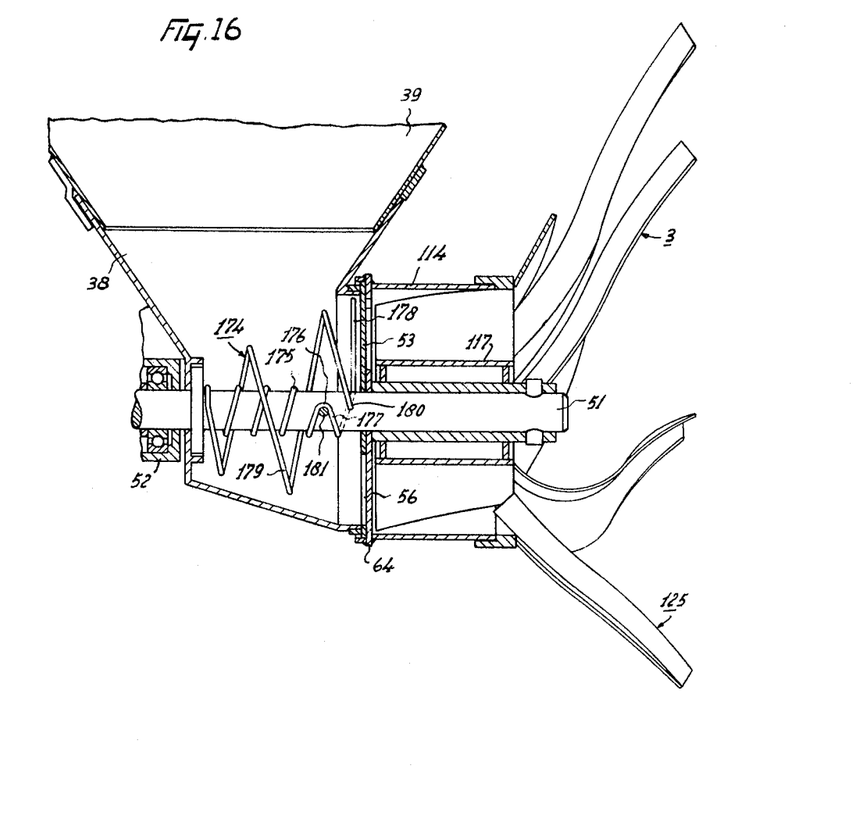

FIGURE 16 illustrates the provision of an impeller 174 in the lower portion 38 of the hopper 2 which has previously been described with reference to FIGURES 1 to 11. The impeller 174, in a similar manner to the previously described impeller 155, is adapted to promote a smooth and continuous delivery of the material to the rotary distributor. The impeller 174 includes a helix 175 having an internal diameter which is the same as that of the shaft 51 and which is wound around the latter. The rearmost end of the helix 175 is connected by a tight bend 176 to a helical portion 177 which extends through only 180° about the shaft 51 in a relatively opposite direction to the helix 175. The rearmost end of the helical portion 177 merges with a straight portion 178 that is contained in a plane extending perpendicular to the shaft 51. The length of the straight portion 178 is approximately equivalent to the radius of the circular plate 53. The leading end of the helix 175 merges with a conical spiral 179 that is wound in the opposite direction to the helix 175 and whose diameter progressively increase in a direction towards the rearmost end of the shaft 51. The unsupported rear end 180 of the spiral 179 is located immediately in front of the circular plate 53. A pin 181 projects radially from the shaft 51 and is partially surrounded by the tight bend 176 at the rearmost end of the helix 175, the arrangement being such that the rotating shaft 51 moves the spiral 179 in a direction which is such that it urges material towards the circular plate 53.

Figure 17:
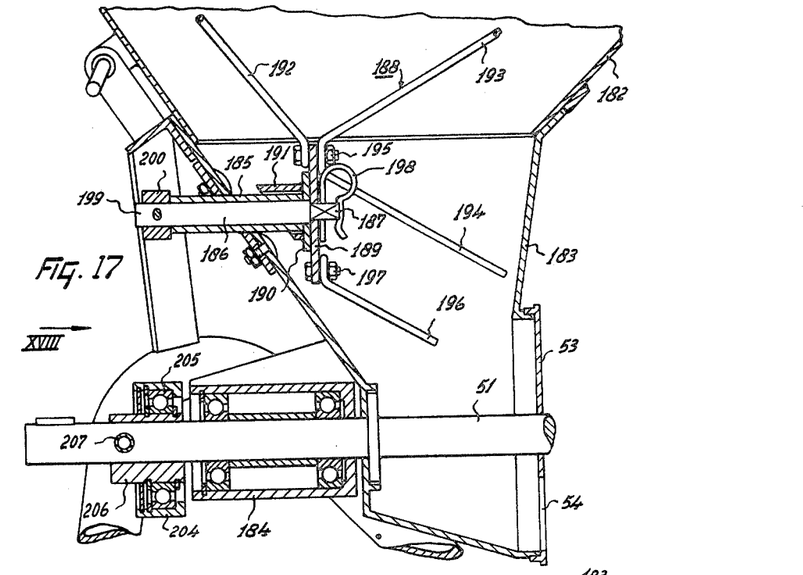
FIGURE 17 is a sectional view of part of the implement, the section being taken in approximately the same plane as that denoted by the arrows III—III of FIGURE 2, and showing additional members of the implement.
Figure 18:
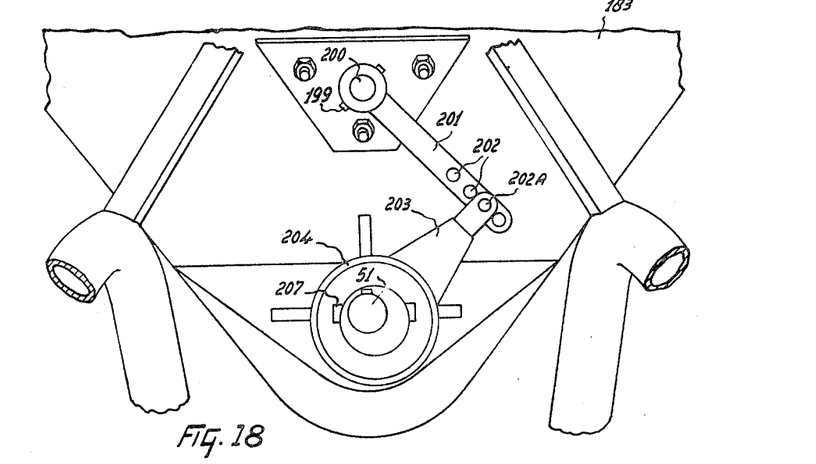
FIGURE 18 is a view as seen in the direction indicated by the arrow XVIII of FIGURE 17, FIGURE 19 corresponds to FIGURE 9 but illustrates an alternative embodiment.

FIGURES 17 and 18 illustrate a modification of the implement in which the portions 39 and 38 of the hopper 2 are replaced by portions 182 and 183 of a different shape. The lower portion 183 of the hopper 2 is rigidly secured to the frame of the implement whereas the upper portion 182 can be readily detached from the frame 1 and from the lower portion 183. The driving shaft 51 traverses the lower portion 183 and is journalled in a horizontal bearing 184 located forwardly of the front wall of the lower portion 183.

The front wall of the portion 183 of the hopper 2 is provided above the bearing 184 with a further horizontal bearing 185 that extends through the said wall. A shaft 186 is journalled in the bearing and its rearmost end, located within the hopper, carries a rectangularly profiled block 187 to which an agitator 188 is secured. The agitator 188 is comprised by a flat plate 189 having an approximately central square hole shaped to fit over the block 187. A resilient retaining pin 198 is entered through a transverse hole formed in the block 187 to prevent the plate 189 becoming detached therefrom. The leading side of the plate 189 relative to the intended direction of travel of the implement has a further plate 190 secured to it, this plate being formed approximately centrally with a circular hole adapted to fit around the shaft 186 immediately beyond the block 187. The leading side of the plate 190 carries a cylindrical sleeve 191 that surrounds the bearing 185. The leading end of the sleeve 191 is inclined to the vertical at substantially the same angle as the wall of the hopper portion 183 which it faces. The parts 190 and 191 act to prevent material contained within the hopper 2 from penetrating to any substantial extent between the shaft 186 and its co-operating bearing 185.

The leading side of the plate 189 has agitating arms 192 secured to it with the aid of a bolt 195, these arms projecting forwardly and upwardly into the upper portion 182 of the hopper. Further integral agitating arms 193 and 194 are secured to the rearmost side of the plate 189 by the same bolt 195, the arms 193 projecting rearwardly and upwardly into the hopper portion 182 while the arms 194 project rearwardly and downwardly into the hopper portion 183. Further agitating arms 196 are fastened to the rearmost side of the plate 189 at the lowermost end thereof by a bolt 197, these arms projecting rearwardly and downwardly into the hopper portion 183. All the agitating arms 192, 193, 194 and 196 are formed from resilient material such as spring steel rod or wire.

The leading end 199 of the shaft 186 which projects from the foremost end of the bearing 185 has a sleeve 200 secured to it with the aid of a transverse pin 202A. An arm 201 projects radially of the sleeve 200 and its free end is formed with a row of holes 202. A pivot pin 202A is entered in a chosen one of the holes 202 to connect the arm 201 to the free forked end of an arm 203. The arm 203 projects from a ring 204 surrounding a ball bearing 205 whose inner race is mounted on an eccentric 206. The eccentric 206 is rigidly secured to the driving shaft 51 by means of a transverse pin 207.

It will be apparent that, when the shaft 51 rotates, the eccentric mounting of the ring 204 will cause the arm 203 to reciprocate carrying the arm 201 and the interconnected shaft 186 and agitator 188 with it. Thus, the agitator 188 will perform a continuous oscillating or rocking motion about the axis of the shaft 186 so that the arms 192, 193, 194 and 196 will maintain the material in the hopper 2 in a free non-caked condition. The amplitude of the oscillating or rocking motion of the agitator 188 can be changed by engaging the pivot pin 202A in different ones of the holes 202.

Figure 19:
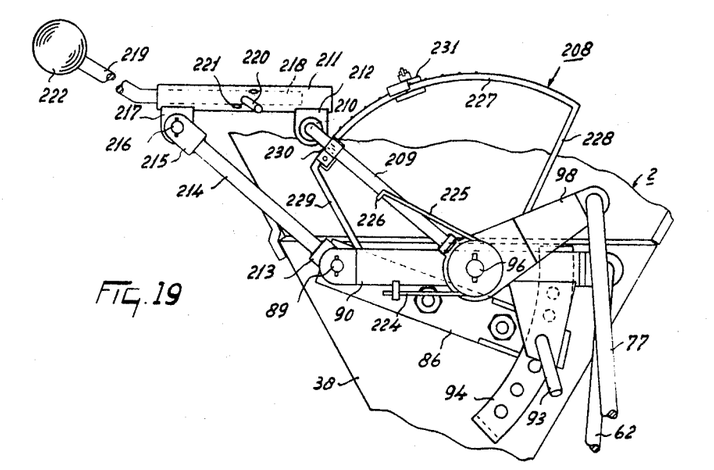
Figure 20:
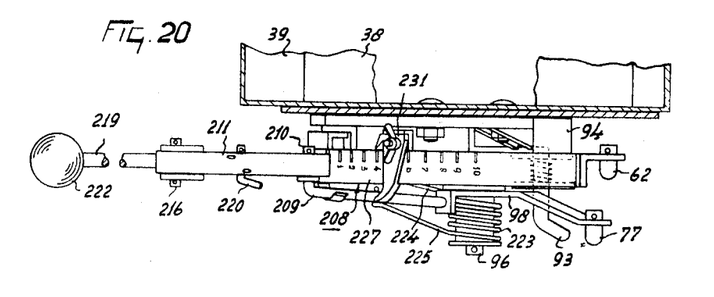
FIGURE 20 is a plan corresponding to FIGURE 19.

FIGURES 19 and 20 of the drawings illustrate an alternative form of adjusting mechanism in which, however, a number of the parts are identical with, or very similar to, parts of the adjusting mechanism 63 that have already been described. Such parts are designated by the same reference numerals as those used in FIGURES 1 to 10 of the drawings. The adjusting mechanism of FIGURES 19 and 20 is generally indicated by the reference numeral 208, the means employed to control the angular setting of the masking plate 64 relative to the circular plate 53 having the outlet ports being different to that previously described. Said means includes a rod 209 secured to the arm 98 adjacent the pivot pin 96. The end 210 of the rod 209 remote from the arm 98 is bent over and pivotally connected to one end of a tube 211 with the aid of a downwardly projecting apertured lug 212. A bracket 213 is turnable about the pivot pin 89 and has one end of a bar 214 connected to it. The opposite end of the bar 214 carries a forked bracket 215 between the ends of which is disposed a lug 217 projecting downwardly from the end of the tube 211 remote from the end carrying the lug 212. A pivot pin 216 is entered through aligned holes formed in the limbs of the bracket 215 and the lug 217.

One end 218 of a control lever 219 is lodged in the tube 211, the relative positions of the parts 218 and 211 being maintained by a transverse locking pin 220 entered through a hole in the end 218 and a pair of holes 221 formed in the tube 211. There are, in fact, several pairs of holes 221 formed in the tube 211 for co-operation with the locking pin 220, said pairs of holes being spaced from one another both longitudinally of the tube 211 and also angularly about the longitudinal axis of the tube. The free end of the control lever 219 is bent over and carries a knob 222.

As can be seen in FIGURE 19, the parts 90, 209, 211 and 214 form the four sides of a parallelogram which is angularly adjustable about the four axes afforded by the parts 89, 96, 216 and 210. A helical spring 223 is wound around a former mounted on the pivot pin 96 and has one end 224 lodged in the hole in the lug 106 while its other end 225 is formed with a bent-over hook 226 that engages beneath the rod 209 approximately mid-way along the length thereof. The spring 223 is formed in such a way that the end 225 thereof tends to turn the rod 209 upwardly in a clockwise direction about the pivot pin 96 as seen in FIGURE 19.

An arcuately curved strip-shaped scale 227 is formed in such a way that its centre of curvature coincides with the longitudinal axis of the pivot pin 96. The opposite ends 228 and 229 of the scale 227 are bent over and fastened to the arm 90. A resilient retaining clip 230 is fastened to the scale 227 alongside the rib 102 numbered "0" and serves the same purpose as the previously described recess 111. A stop 231 of substantially identical construction to the previously described stop 103 is mounted slidably upon the scale 227 and can be retained in any chosen setting there-along.

The simultaneous angular adjustment of the plates 53 and 64 about the longitudinal axis of the driving shaft 51 is accomplished in the same manner as has previously been described with reference to FIGURES 1 to 8 of the drawings. However, when it is desired to turn the masking plate 64 relative to the circular plate 53, the angularity of the aforementioned parallelogram is altered by grasping the knob 222 and moving the control lever 219 in an appropriate direction. Since the parts 227, 230 and 231 co-operate with the rod 209 in the same manner as the parts 99, 111 and 103 co-operate with the lever 97, it is unnecessary to describe their function any further.

The actuation of the coupling rod 77 through the intermediary of an angularly adjustable parallelogram enables the control lever 219 to be lengthened or shortened as required so that the knob 222 can be located in a readily accessible position for the driver of a particular tractor or other supporting and propelling vehicle with which the implement is frequently used. The position of the knob 222 relative to the frame 1 of the implement can also be changed to the same end by connecting the part 218 of the lever 219 to the tube 211 with the aid of different pairs of the holes 221.

What we claim is:

1. An implement for spreading material comprising a frame, a hopper and a rotary distributor, a ported member having outlet ports located between said hopper and distributor, said ported member and said distributor being turnable about a substantially horizontal axis, a masking member having outlet holes mounted adjacent said ported member, said masking member turnable about a substantially horizontal axis, said ported member and said masking member being pivotally mounted and independently adjustable, a first means connected to said ported member for adjusting same and a second means connected to said masking member for adjusting same, coupling means for selectively coupling said first and second means for permitting simultaneous movement of said ported and masking members, connecting means on said masking member for connection to said second means in a plurality of settings whereby said masking member is turnable by said second means from any of said settings.

2. The invention of claim 1 wherein the ported member and the masking member are circular and turnable about a coincident axis.

3. The invention of claim 1 wherein the ported member is provided with three outlet ports two of which are substantially identical and the masking member is provided with at least two outlet holes that correspond in dimensions with the ports in the ported member.

4. The invention of claim 3 wherein the two identical ports are positioned approximately 180° from one another and the third port is located substantially midway between said identical ports, said masking member having four outlet holes, two of said holes corresponding in relative location and shape to said identical ports in said ported member.

5. The invention of claim 4 wherein said third port is trapezoidal in shape and said masking member includes a third outlet hole trapezoidal in shape which outlet hole is closer to one of said mentioned two holes than the other whereby when said two identical ports are in register with said mentioned two holes, said third port and third outlet are out of register.

6. The invention of claim 5 wherein said masking member includes a fourth outlet hole which is located closer to one of said mentioned two holes than the other whereby said fourth outlet hole can be positioned partly in register with either of said identical ports to provide the sole outlet to said distributor.

7. The invention of claim 1 wherein an impeller is provided within the hopper adjacent the ported member, said impeller being arranged to urge material towards the distributor.

8. The invention of claim 7 wherein the impeller comprises a helical portion and a spiral portion, said portions being rotatable about the same axis of rotation of said members and said distributor.

9. The invention of claim 1 wherein an agitator is provided within the hopper, said agitator having arms projecting obliquely upwardly and downwardly within the hopper.

10. The invention of claim 1 wherein the distributor has a plurality of spreading blades, each blade being inclined to the axis of rotation of the distributor at an angle other than 90°, each blade having two curved portions including a convex and a concave portion.

11. The invention of claim 10 wherein the convex portion of each blade is located radially closer to the axis of rotation of the distributor than the other curved portion.

12. The invention of claim 1 wherein the distributor has a plurality of blades, each blade being inclined to the axis of rotation of the distributor at an angle other than 90°, the roots of said blades adjoining the said ported member, and said distributor including an annular ring that is connected to the roots of the blades and 13. The invention of claim 1 wherein a strip scale is mounted on said first means and said second means includes a control lever movable along said scale for adjusting said masking member and said ported member relative to each other, said lever and said scale being movable together whereby said ported and masking members are movable simultaneously.

14. The invention of claim 1 wherein a hood-shaped delivery spout is disposed concentrically around the axis of rotation of the distributor between the distributor and the ported member, said spout including at least one vane for delivering material from the hopper to the distributor, said distributor adjoining an open end of said spout.

15. The invention of claim 14 wherein the distributor has a plurality of spreading blades, said spout including a number of vanes equal to the number of spreading blades, said vanes dividing the spout into a plurality of separate compartments.

References Cited by the Examiner

UNITED STATES PATENTS

| Re. 554 | 5/1958 | Cahoon | 275—8 |
| 571,896 | 11/1896 | Clover | 111—11 |
| 2,543,586 | 2/1951 | Nabors | 275—8 |
| 2,672,259 | 3/1954 | Hobgood | 276—8 X |
| 2,874,878 | 2/1959 | Stokland. | |

FOREIGN PATENTS

| 1,134,277 | 11/1956 | France. |
| 1,185,624 | 2/1959 | France. |
| 15,522 | 8/1893 | Great Britain. |
| 730,989 | 6/1955 | Great Britain. |

ABRAHAM G. STONE, *Primary Examiner.*